United States Patent
Taira et al.

(10) Patent No.: US 9,373,253 B2
(45) Date of Patent: Jun. 21, 2016

(54) SAFETY CONTROLLER AND SAFETY CONTROL METHOD

(71) Applicants: Tetsuya Taira, Nisshin (JP); Hiroshi Bitoh, Toyota (JP)

(72) Inventors: Tetsuya Taira, Nisshin (JP); Hiroshi Bitoh, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 175 days.

(21) Appl. No.: 14/191,645

(22) Filed: Feb. 27, 2014

(65) Prior Publication Data

US 2014/0313017 A1  Oct. 23, 2014

(30) Foreign Application Priority Data

Apr. 17, 2013  (JP) .................................. 2013-086495

(51) Int. Cl.
*G08C 19/24* (2006.01)
*G05B 9/02* (2006.01)

(52) U.S. Cl.
CPC ........ *G08C 19/24* (2013.01); *G05B 9/02* (2013.01); *G05B 2219/25352* (2013.01); *G05B 2219/34382* (2013.01)

(58) Field of Classification Search
None
See application file for complete search history.

(56) References Cited

U.S. PATENT DOCUMENTS

| | | | | |
|---|---|---|---|---|
| 8,457,766 B2* | 6/2013 | Taira | ...................... | B25J 9/1656 700/21 |
| 8,706,265 B2* | 4/2014 | Taira | ...................... | B25J 9/1656 700/21 |
| 8,756,606 B2* | 6/2014 | Taira | ...................... | B25J 9/1656 718/103 |
| 8,880,201 B2* | 11/2014 | Taira | ........................ | G05B 9/02 700/21 |
| 8,902,082 B2* | 12/2014 | Roesner | ........... | G06K 19/07749 340/905 |
| 2009/0210879 A1 | 8/2009 | Kaiser et al. | | |
| 2012/0197416 A1 | 8/2012 | Taira et al. | | |
| 2012/0198464 A1* | 8/2012 | Taira | ........................ | G05B 9/02 718/103 |
| 2013/0310976 A1* | 11/2013 | Taira | ...................... | B25J 9/1656 700/250 |
| 2014/0313017 A1* | 10/2014 | Taira | ...................... | G08C 19/24 340/12.22 |
| 2015/0259021 A1* | 9/2015 | Nakayama | ............. | B62K 3/007 701/124 |

FOREIGN PATENT DOCUMENTS

| | | |
|---|---|---|
| JP | S61-244151 A | 10/1986 |
| JP | 2004-27851 A | 1/2004 |
| JP | 2010-271759 A | 12/2010 |
| WO | 2012/104901 A1 | 8/2012 |

* cited by examiner

*Primary Examiner* — Brian Miller
(74) *Attorney, Agent, or Firm* — Kenyon & Kenyon LLP

(57) ABSTRACT

A safety controller includes a first interrupt signal output unit outputting a first interrupt signal in a cycle synchronous with that of a first carrier signal defining a control cycle of a control target; a second interrupt signal output unit outputting a second interrupt signal in a cycle synchronous with that of a second carrier signal defining a control cycle of the control target, the first and second carrier signals having the same cycle and a predetermined phase difference; and a control unit executing tasks and controlling the control target by switching and scheduling time partitions according to outputs of the first and second interrupt signals from the first and second interrupt signal output units. The control unit stops controlling the control target upon detecting, as an abnormality related to the first and second interrupt signals, that the first and second interrupt signals are not output in a predetermined order.

11 Claims, 14 Drawing Sheets

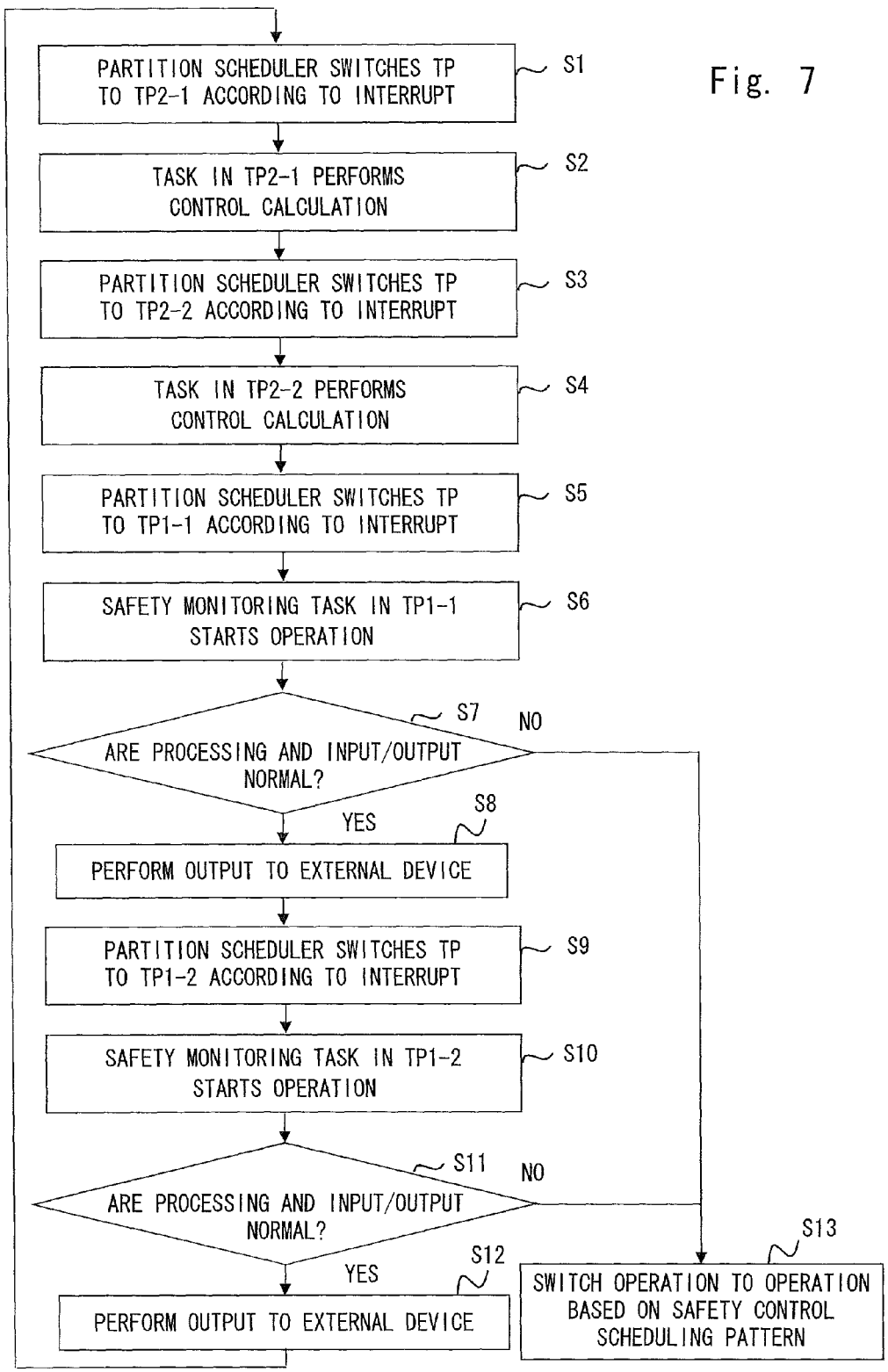

SAFETY CONTROLLER AND SAFETY CONTROL METHOD

INCORPORATION BY REFERENCE

This application is based upon and claims the benefit of priority from Japanese patent application No. 2013-086495, filed on Apr. 17, 2013, the disclosure of which is incorporated herein in its entirety by reference.

BACKGROUND OF THE INVENTION

1. Field of the Invention

The present invention relates to a safety controller mounted in a service robot, transportation equipment, and the like to ensure functional safety, and particularly to a safety controller using a computer system.

2. Description of Related Art

Service robots are required to ensure functional safety by constantly monitoring a safety state using an external sensor and a self-diagnosis device and by executing appropriate safety control logic upon detecting some risk.

IEC 61508 has been established as an international standard for functional safety of the service robots described above as well as systems which operate on an electrical principle, such as transportation equipment. In IEC 61508, a system provided to ensure functional safety is called a safety-related system. IEC 61508 defines various techniques for constructing the safety-related system using hardware, such as a microprocessor and a PLC (Programmable Logic Controller), and a computer program (software). The use of techniques defined in IEC 61508 makes it possible to construct the safety-related system using a computer system.

Meanwhile, in recent years, the throughput of programmable electronic devices, such as a microprocessor, has been improved. Accordingly, various application programs are executed in parallel on a computer system by using a multi-task OS (Operating System), thereby enabling integration of computer systems which are mounted in equipment, such as a service robot and a vehicle, for various purposes.

International Patent Publication No. WO 2012/104901, for example, discloses a technique for causing an application program related to ensuring of functional safety (hereinafter, referred to as "safety-related application") and another application program (hereinafter, referred to as "non-safety-related application") to run on a computer system by allocating the application programs to separate time partitions.

International Patent Publication No. WO 2012/104901 also discloses a technique in which a carrier interrupt is generated in synchronization with a cycle of a carrier signal for use in PWM control of an actuator to be controlled, and time partitions are switched upon generation of the interrupt. This enables control in synchronization with a control cycle of a control target.

Furthermore, International Patent Publication No. WO 2012/104901 discloses a technique in which a plurality of carrier signals with shifted phases is generated by a plurality of transmitters, to thereby shorten the interval of generating carrier interrupts and obtain a finer resolution of time partitions (time interval for switching time partitions). This leads to a reduction in delay of controlling the control target.

As described above, according to the technique disclosed in International Patent Publication No. WO 2012/104901, a plurality of carrier signals with shifted phases causes multiple carrier interrupts, which trigger switching of time partitions, to be generated, thereby shortening the time interval of switching time partitions and speeding up the control in synchronization with the control cycle of the control target. However, the applicant of the present invention has found the following problems inherent in the technique.

First, description is made assuming that an operation is performed as illustrated in FIG. 12 of the present application during a normal operation. FIG. 12 shows an example in which two carrier signals having the same cycle and phases shifted from each other by a half cycle are output from two transmitters. Accordingly, in this case, the carrier interrupt which is generated every one cycle of one carrier signal (illustrated as "carrier interrupt 1") and the carrier interrupt which is generated every one cycle of the other carrier signal (illustrated as "carrier interrupt 2") are generated alternately at regular intervals.

On the other hand, FIG. 13 of the present application illustrates a first case which poses a problem. FIG. 13 shows an example in which a failure occurs in one or both of the transmitters and the output timing of one or both of the carrier signals is shifted. In such a case, the generation timing of each of "carrier interrupt 1" and "carrier interrupt 2" is also shifted, so that the carrier interrupts are not generated at regular intervals. In this case, time partitions are not switched at regular intervals. This causes a problem that the lengths of the time partitions are set at non-regular intervals and processing related to control of the control target is not carried out as scheduled. For example, it is impossible to execute all scheduled processing within a shortened time partition.

Next, FIG. 14 of the present application illustrates a second case which poses a problem. FIG. 14 shows an example in which a failure occurs in one of the transmitters and one of the carrier signals is not output. In this case, one of the carrier interrupts, i.e., "carrier interrupt 2" is not generated, and only "carrier interrupt 1" is generated at an interval twice as long as an expected interval. In this case, the interval of switching time partitions is doubled. This causes a problem that the length of each time partition is doubled and processing related to control of the control target is not carried out as scheduled. For example, the processing is to be executed behind schedule.

The use of one carrier interrupt generation source (a transmitter and a carrier interrupt generation circuit) eliminates the difference between the output states of two carrier signals as described above and prevents the occurrence of a deviation in the timing of generating carrier interrupts due to the difference. However, the time interval of switching time partitions cannot be shortened, which results in deterioration of the high-speed control in synchronization with the control cycle of the control target.

The present invention has been made based on the above findings, and it is an object of the present invention to provide a safety controller and a safety control method which are capable of further improving the safety while maintaining the high-speed control of the control target.

SUMMARY OF THE INVENTION

A safety controller according to a first exemplary aspect of the present invention includes: a first carrier signal generation unit that generates a first carrier signal defining a control cycle of a control target; a second carrier signal generation unit that generates a second carrier signal defining a control cycle of the control target, the first carrier signal and the second carrier signal having the same cycle and a predetermined phase difference; a first interrupt signal output unit that outputs a first interrupt signal in a cycle synchronous with the cycle of the first carrier signal generated by the first carrier signal generation unit; a second interrupt signal output unit that outputs a second interrupt signal in a cycle synchronous with the cycle of the second carrier signal generated by the second carrier signal generation unit; and a control unit that executes tasks for executing processing related to control of the control target and controls the control target by switching and scheduling a plurality of time partitions according to an output of the first interrupt signal from the first interrupt signal output unit and an output of the second interrupt signal from the second interrupt signal output unit, at least one of the tasks being allocated to each of the plurality of time partitions. The control unit stops the control of the control target upon detecting, as an abnormality related to the first interrupt signal and the second interrupt signal, a fact that the first interrupt signal and the second interrupt signal are not output in a predetermined order (for example, alternately).

A safety control method according to a second exemplary aspect of the present invention is a safety control method that executes tasks for executing processing related to control of a control target and controls the control target by scheduling a plurality of time partitions, at least one of the tasks being allocated to each of the plurality of time partitions, the safety control method including the steps of: outputting a first interrupt signal which is output in a cycle synchronous with a cycle of a first carrier signal defining a control cycle of the control target; switching an active time partition to a time partition to be subsequently scheduled, according to the output of the first interrupt signal; outputting a second interrupt signal which is output in a cycle synchronous with a cycle of a second carrier signal defining a control cycle of the control target, the first carrier signal and the second carrier signal having the same cycle and a predetermined phrase difference; and switching an active time partition to a time partition to be subsequently scheduled, according to the output of the second interrupt signal. The control of the control target is stopped when it is detected that the first interrupt signal and the second interrupt signal are not output in a predetermined order (for example, alternately).

According to the above-described exemplary aspects of the present invention, when the first interrupt signal and the second interrupt signal, which trigger switching of time partitions, are not output in the predetermined order and the processing related to the control of the control target is not carried out as scheduled, the control of the control target is stopped, thereby further improving the safety. Furthermore, the first and second interrupt signals are generated in synchronization with the first and second carrier signals having a phase difference, thereby shortening the time interval of switching time partitions. That is, according to exemplary aspects of the present invention, it is possible to provide a safety controller and a safety control method which are capable of further improving the safety while maintaining the high-speed control of the control target.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 7 is a flowchart showing a specific example of a partition scheduling procedure carried out by the partition scheduler;

DESCRIPTION OF THE EXEMPLARY EMBODIMENTS

Figure 1:
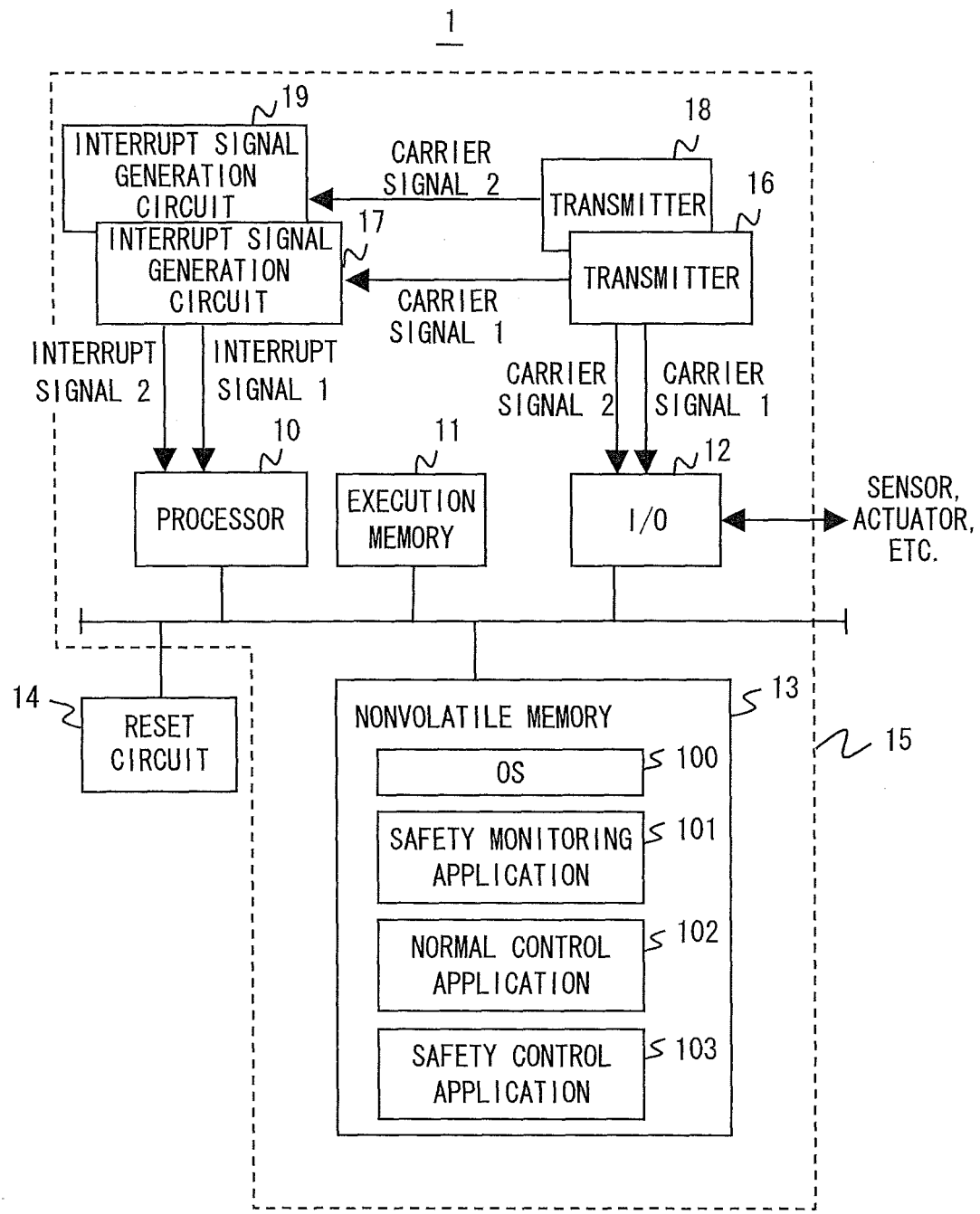
FIG. 1 is a block diagram showing an exemplary configuration of a safety controller according to an exemplary embodiment of the invention.

Exemplary embodiments of the present invention will be described in detail below with reference to the drawings. Throughout the drawings, the same elements are denoted by the same reference numerals, and a repeated explanation thereof is omitted as needed for clarity of the explanation.

Exemplary Embodiment of the Invention

A safety controller 1 according to this exemplary embodiment is mounted in a service robot, transportation equipment, or the like and executes safety control for ensuring functional safety. The safety controller 1 is configured to execute a safety-related application and a non-safety-related application in one computer system. FIG. 1 is a block diagram showing a configuration example of the safety controller 1 according to this exemplary embodiment.

The safety controller 1 includes a reset circuit 14 and a microcontroller 15. The microcontroller 15 includes a processor 10, an execution memory 11, an I/O port 12, transmitters 16 and 18, and interrupt signal generation circuits 17 and 19.

The processor 10 fetches programs (instruction stream), decodes instructions, and carries out arithmetic processing according to the result of instruction decoding. Though only one processor 10 is illustrated in FIG. 1, the safety controller 1 may have a multiprocessor configuration including a plurality of processors 10. The processor 10 may be a multicore processor. The processor 10 executes an operating system (OS) 100 as a system program to thereby provide a multiprogramming environment. The multiprogramming environment means an environment in which a plurality of programs are assumed to be executed in parallel by periodically switching a plurality of programs to be executed or by switching programs to be executed upon generation of an event.

Multiprogramming is sometimes called a multiprocess, multithread, multitask, or the like. Each of a process, a thread, and a task indicates a program unit to be executed in parallel in the multiprogramming environment. The multiprogramming environment included in the processor 10 according to this exemplary embodiment may be a multiprocess environment or a multithread environment.

The execution memory 11 is a memory used for the processor 10 to execute programs. The execution memory 11 stores programs (OS 100, applications 101 to 103, etc.), which are loaded from a nonvolatile memory 13, input and output data to and from the processor 10, and the like. Note that the processor 10 may directly execute these programs from the nonvolatile memory 13 without loading the programs from the nonvolatile memory 13 into the execution memory 11.

Specifically, the execution memory 11 may be a randomly accessible volatile memory such as an SRAM (Static Random Access Memory) or a DRAM (Dynamic Random Access Memory). The execution memory 11 of FIG. 1 shows logical units. That is, the execution memory 11 may be implemented as a combination of a plurality of SRAM devices, a combination of a plurality of DRAM devices, or a combination of an SRAM device and a DRAM device, for example.

The I/O port 12 is used for data transmission and reception to and from external devices. When the safety controller 1 is mounted in a service robot, for example, the external devices are a visual sensor capable of measuring obstacles around the service robot, an actuator for causing the service robot to operate, and the like.

The I/O port 12 generates a PWM signal based on a command value output from the processor 10, and outputs the generated PWM signal to the actuator. Thus, the control target including the actuator is controlled. Specifically, this exemplary embodiment illustrates the case where the actuator in the external device is a motor to be controlled by the PWM signal. Every one cycle of each of the carrier signals output from the transmitters 16 and 18, the I/O port 12 updates the PWM signal value, which is output to the actuator, such that the PWM signal value represents a control content indicated by the command value output from the processor 10. Accordingly, the I/O port 12 includes a PWM circuit (not shown) that generates the PWM signal based on the command value.

The nonvolatile memory 13 is a memory device capable of maintaining storage contents more stably than the execution memory 11 without being supplied with power. The nonvolatile memory 13 is, for example, a ROM (Read Only Memory), a flash memory, a hard disk drive, an optical disk drive, or a combination thereof. The nonvolatile memory 13 stores the OS 100 and the applications 101 to 103. Note that at least a part of the nonvolatile memory 13 may be configured to be removable from the safety controller 1. For example, the memory storing the applications 101 to 103 may be removably mounted. Alternatively, at least a part of the nonvolatile memory 13 may be disposed outside the safety controller 1.

The OS 100 is executed by the processor 10 so as to perform task management including task scheduling, interrupt management, time management, and resource management, and to provide a mechanism for inter-task synchronization and inter-task communication, for example, by using hardware resources such as the processor 10, the execution memory 11, and the nonvolatile memory 13.

In addition, the OS 100 has a function of protecting hardware resources temporally and spatially in order to increase the independence of the safety monitoring application 101 and the safety control application 103, which are related to ensuring of functional safety, from the normal control application 102. Here, the hardware resources include the processor 10, the execution memory 11, and the I/O port 12.

Out of these functions, temporal protection is performed by partitioning a temporal resource such as an execution time of the processor 10. Specifically, the temporal protection is performed by partitioning the execution time of the processor 10 and allocating a task (a process or a thread) to each partition (referred to as "time partition"). A scheduling function (partition scheduler 21) of the OS 100 provides a guarantee of use of resources, including the execution time of the processor 10, to the task allocated to each time partition (hereinafter, abbreviated as "TP" in some cases).

Figure 2:
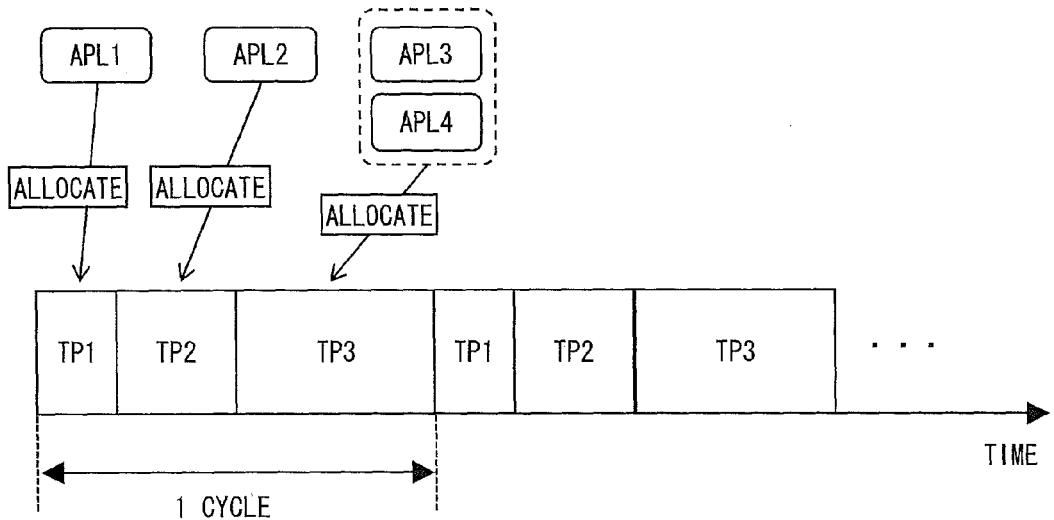
FIG. 2 is a diagram for explaining the concept of time partitioning in an exemplary embodiment of the invention.

FIG. 2 is a conceptual diagram relating to the time partitioning. FIG. 2 shows an example in which a predetermined one-cycle time is divided into three time partitions of TP1, TP2, and TP3. Assuming that the one-cycle time is 100 ticks, the first 20 ticks are defined as TP1, the middle 30 ticks are defined as TP2, and the last 50 ticks are defined as TP3.

In the example shown in FIG. 2, a first application (APL1) to a fourth application (APL4) are allocated to any of TP1 to TP3. The scheduling function (partition scheduler 21) of the OS 100 selects and decides one of TP1 to TP3 to be activated according to a lapse of time. Then, the application allocated to the active TP is executed by the processor 10.

Meanwhile, spatial protection is performed by partitioning stationary resources including the execution memory 11 and the I/O port 12, and by allocating a task to each partition (referred to as "resource partition"). The scheduling function (partition scheduler 21) of the OS 100 inhibits the task from exceeding the resource partition preliminarily allocated (hereinafter, abbreviated as "RP" in some cases) and from accessing other resources.

Figure 3:
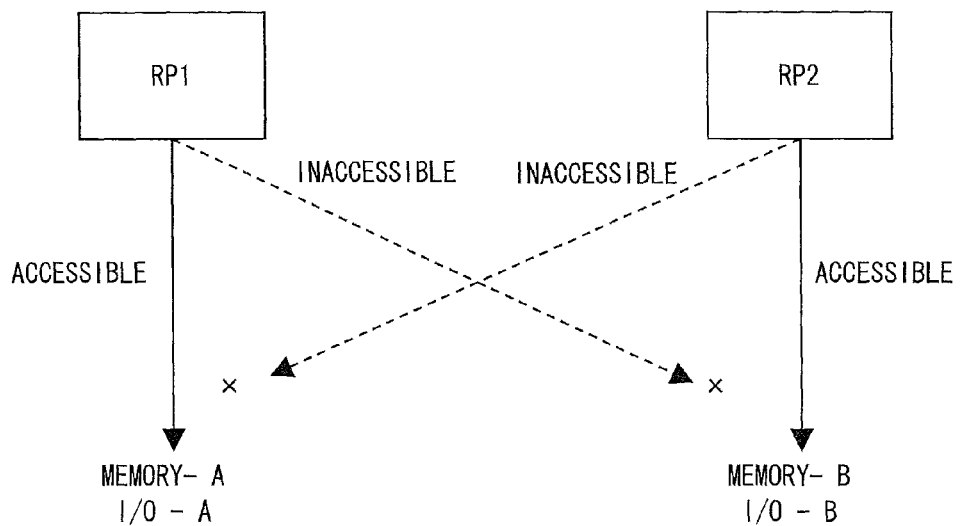
FIG. 3 is a conceptual diagram for explaining the concept of resource partitioning in an exemplary embodiment of the invention.

FIG. 3 is a conceptual diagram relating to the resource partitioning. The example of FIG. 3 shows two RPs (RP1 and RP2). A part (A area) of each of the nonvolatile memory 13 and the execution memory 11 and a part (port A) of the I/O port 12 are allocated to RP1. Further, another part (B area) of each of the execution memory 11 and the nonvolatile memory 13 and another part (port B) of the I/O port 12 are allocated to RP2. Access from RP1 to the resources allocated to RP2 is inhibited, and access from RP2 to the resources allocated to RP1 is inhibited.

Note that there is no need to exclusively allocate all the resources to any one of the RPs. That is, the resources may be shared by a plurality of RPs. For example, in the case of performing safety control of a service robot, it is necessary for the actuator to be accessible from both the normal control application 102 and the safety control application 103. In this case, the I/O port for controlling the actuator may be shared by the RP to which the normal control application 102 belongs and the RP to which the safety control application 103 belongs.

Referring back to FIG. 1, the description will be continued. The applications 101 to 103 are executed in the multiprogramming environment provided by the OS 100 and the processor 10. Among these applications, the safety monitoring application 101 includes instruction code for causing the processor 10 to execute monitoring of the running status of the normal control application 102, monitoring of the running status of the safety control application 103, and monitoring of the input and output data to and from the I/O port 12. The safety monitoring application 101 also includes instruction code for causing the processor 10 to execute notification of the result to the partition scheduler 21. That is, the safety monitoring application 101 is a safety-related application.

The normal control application 102 includes instruction code for causing the processor 10 to execute a control procedure to cause a control target, such as a service robot, to execute a normal function/operation. The normal control application 102 also includes instruction code for causing the processor 10 to execute notification of the result to the partition scheduler 21. That is, the normal control application 102 is a non-safety-related application.

The safety control application 103 includes instruction code for causing the processor 10 to execute a control procedure prescribed to ensure functional safety in a case where some abnormality is detected. The safety control application 103 also includes instruction code for causing the processor 10 to execute notification of the result to the partition scheduler 21. That is, the safety control application 103 is a safety-related application.

The reset circuit 14 resets the microcontroller 15 based on a signal from the OS 100. A transmit signal is periodically transmitted from the partition scheduler 21 to the reset circuit 14, and when the transmit signal from the partition scheduler 21 is interrupted, the reset circuit 14 resets the microcontroller 15. For example, as described later, the partition scheduler 21 transmits the transmit signal at the timing when the partition scheduler 21 operates every one tick. When an abnormality is detected in the OS 100, or when a result notification indicating an abnormality is received from any one of the applications 101 to 103, the partition scheduler 21 may transmit a reset signal to the reset circuit 14 so that the reset circuit 14 resets the microcontroller 15 according to the reset signal. This configuration allows the microcontroller 15 to be reset and restored when a malfunction occurs in the microcontroller 15.

The transmitter 16 generates a carrier signal and outputs the generated carrier signal to each of the I/O port 12 and the interrupt signal generation circuit 17. The transmitter 18 generates a carrier signal and outputs the generated carrier signal to each of the I/O port 12 and the interrupt signal generation circuit 19. The transmitter 16 and the transmitter 18 generate carrier signals having the same cycle and different phases. The following description is made assuming that the two carrier signals output from the transmitter 16 and the transmitter 18 have phases shifted from each other by a half cycle. Each of the transmitters 16 and 18 corresponds to a carrier signal generation unit.

The interrupt signal generation circuit 17 generates an interrupt signal and outputs the generated interrupt signal to the processor 10 based on the cycle of the carrier signal output from the transmitter 16. Specifically, upon detecting a valley portion or a peak portion of the carrier signal, the interrupt signal generation circuit 17 generates the interrupt signal and outputs the generated interrupt signal to the processor 10. That is, upon detecting a vertex of a triangular wave of the carrier signal, the interrupt signal generation circuit 17 generates the interrupt signal and outputs the generated interrupt signal to the processor 10. As a result, a carrier interrupt from the interrupt signal generation circuit 17 to the processor 10 is generated every one cycle of the carrier signal output from the transmitter 16.

As with the interrupt signal generation circuit 17, the interrupt signal generation circuit 19 generates an interrupt signal and outputs the generated interrupt signal to the processor 10 based on the carrier signal output from the transmitter 18. As a result, a carrier interrupt from the interrupt signal generation circuit 19 to the processor 10 is generated every one cycle of the carrier signal output from the transmitter 18. Each of the interrupt signal generation circuits 17 and 19 corresponds to an interrupt signal output unit.

Accordingly, during a time corresponding to one cycle of the carrier signal, two interrupt signals in total are generated by the interrupt signal generation circuit 17 and the interrupt signal generation circuit 19 and are output to the processor 10. Further, as described above, the two carrier signals input to the interrupt signal generation circuit 17 and the interrupt signal generation circuit 19 have the same cycle and phases shifted from each other by a half cycle. Accordingly, the two interrupt signals output from the interrupt signal generation circuit 17 and the interrupt signal generation circuit 19 are also output in the same cycle and at timings shifted from each other by a half cycle. That is, the interrupt signals are alternately output from the interrupt signal generation circuit 17 and the interrupt signal generation circuit 19 at regular intervals.

Figure 4:
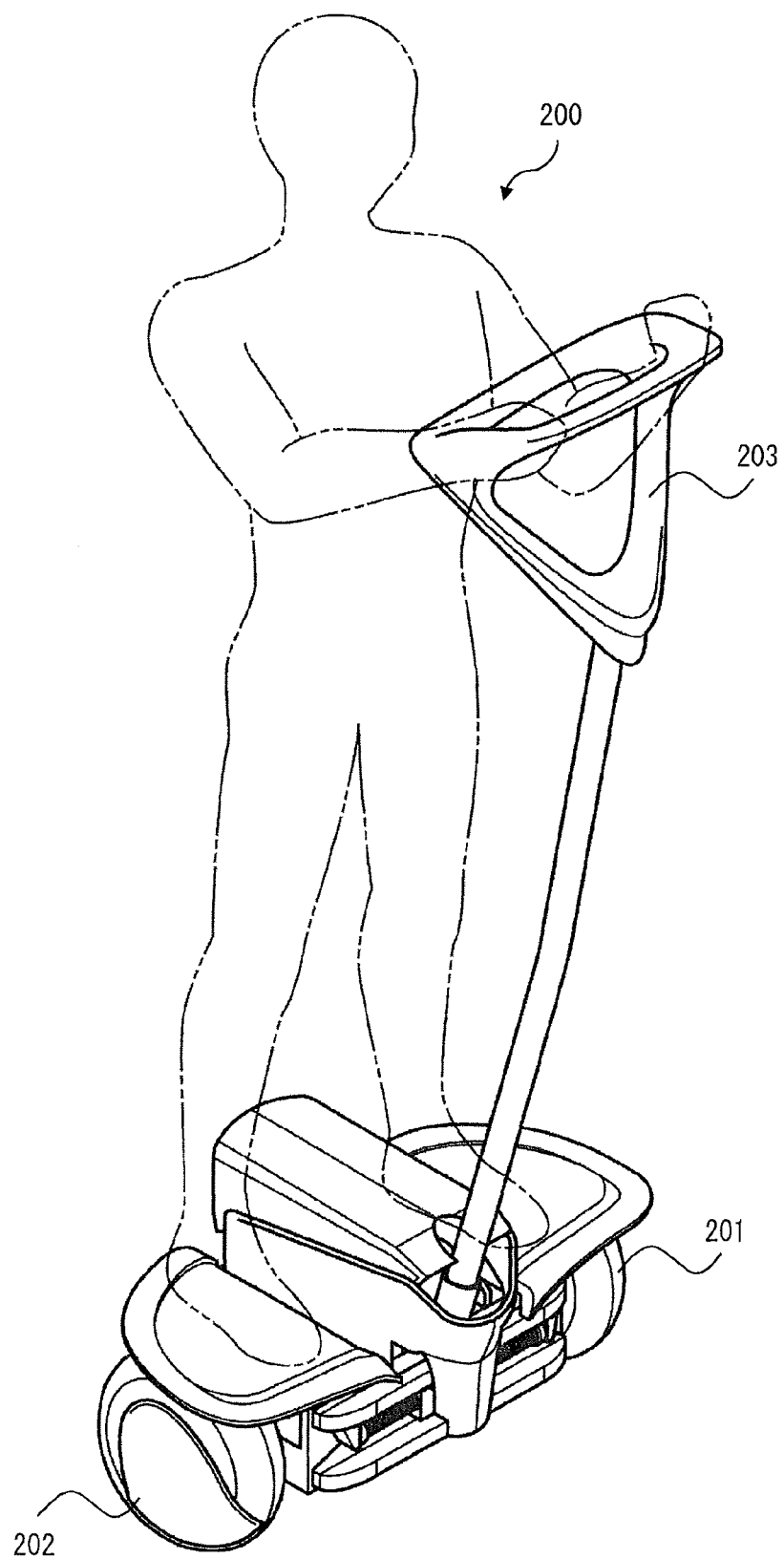
FIG. 4 is a view showing an example of a control target according to an exemplary embodiment of the invention.

Hereinafter, the case where the control target of the safety controller 1 described above is an inverted two-wheel vehicle 200 shown in FIG. 4 will be described. The safety controller 1 is mounted in the housing of the inverted two-wheel vehicle 200. The inverted two-wheel vehicle 200 transports a passenger, who gets on board while gripping a handle 203, by rotating left and right wheels 201 and 202. In this case, various sensors serving as external devices include a gyroscopic sensor which detects, as a sensor value, a pitch angular velocity for deriving a posture angle of the inverted two-wheel vehicle 200, and a rotation angle sensor which detects, as a sensor value, a rotation angle of each of the left and right wheels 201 and 202 of the inverted two-wheel vehicle 200. Actuators serving as external devices respectively function as a motor that causes the left wheel 201 of the inverted two-wheel vehicle 200 to rotate, and a motor that causes the right wheel 202 to rotate.

In this case, the I/O port 12 controls the motors based on the two carrier signals from the transmitters 16 and 18 as described above. The I/O port 12 controls the two-axis motors by the two carrier signals, respectively. Specifically, the I/O port 12 controls the motor which causes the left wheel 201 to rotate based on the carrier signal from the transmitter 16, and controls the motor which causes the right wheel 202 to rotate based on the carrier signal from the transmitter 18. That is, the processor 10 outputs the command value for each axis to the I/O port 12. Then, the I/O port 12 generates a PWM signal for each axis based on the command value for each axis from the processor 10 and outputs the generated PWM signal to each axis (each motor). In this case, every one cycle of the carrier signal from the transmitter 16, the I/O port 12 updates the PWM signal for the motor of the left wheel 201 based on the command value for the motor of the left wheel 201 which is supplied from the processor 10. The I/O port 12 updates the PWM signal with respect to the motor of the right wheel 202 based on the command value for the motor of the right wheel 202, which is supplied from the processor 10, for each cycle of the carrier signal from the transmitter 18.

Figure 5:
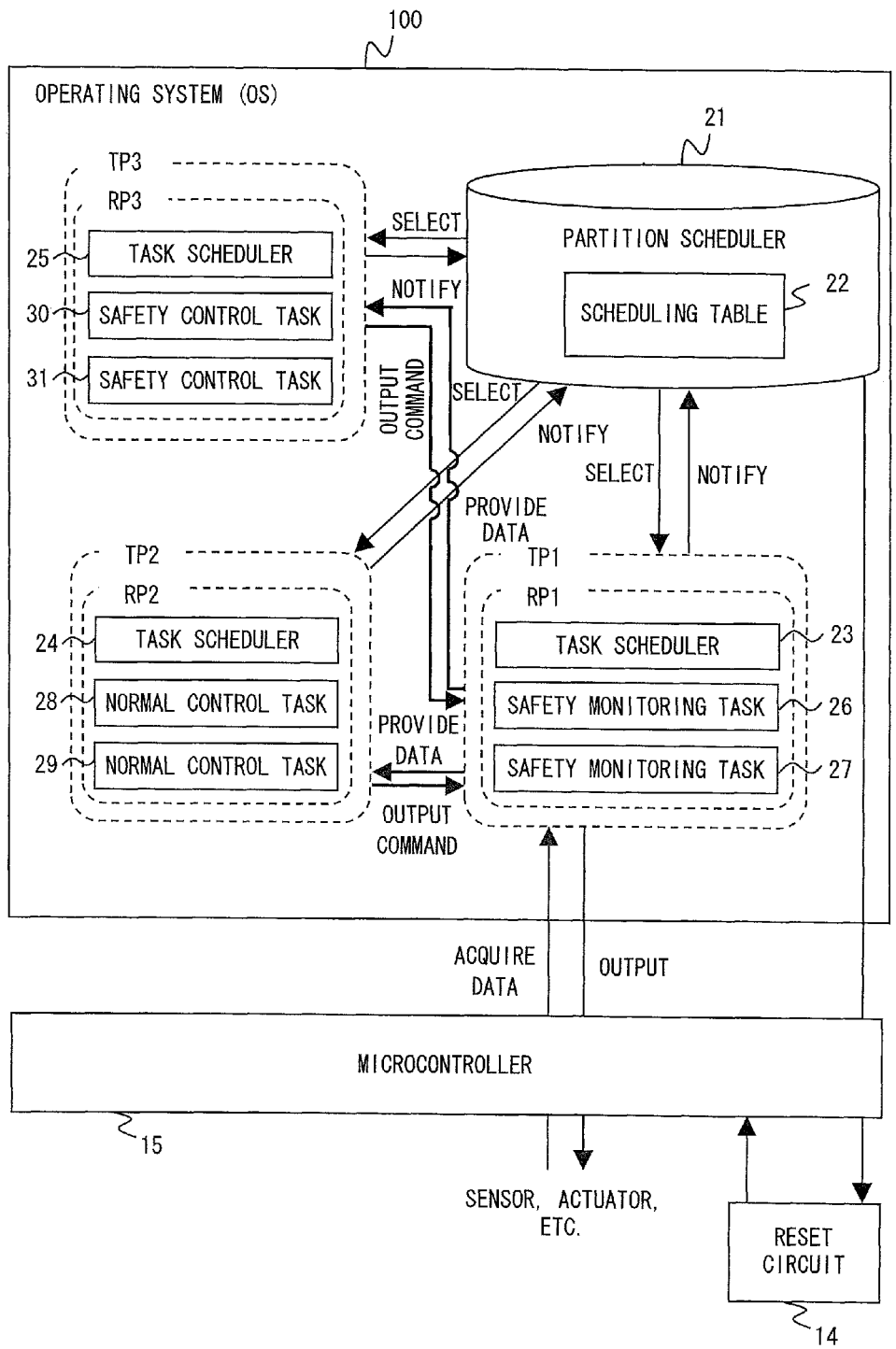
FIG. 5 is a diagram showing relationships between a partition scheduler and tasks according to an exemplary embodiment of the invention.

The relationships between the partition scheduler 21 and tasks 26 to 31 generated upon activation of the applications 101 to 103 will be described below with reference to FIG. 5. FIG. 5 is a diagram showing the relationships between the partition scheduler 21 and the tasks 26 to 31 which are activated in the multiprogramming environment provided by the OS 100.

FIG. 5 illustrates a configuration in which the reset circuit 14 is provided outside the microcontroller 15, but a configuration in which the reset circuit 15 is provided in the microcontroller 15 may also be employed.

The processor 10 causes the partition scheduler 21 to operate when the interrupt signal is output from each of the interrupt signal generation circuit 17 and the interrupt signal generation circuit 19. In this exemplary embodiment, description is made assuming that the operation cycle (output cycle of the interrupt signal) of the partition scheduler 21 is one tick. Accordingly, the processor 10 executes the OS 100 to thereby allow the partition scheduler 21 to operate every one tick and allow task schedulers 23, 24, and 25 and tasks (safety monitoring tasks 26 and 27, normal control tasks 28 and 29, and safety control tasks 30 and 31) to operate in each TP.

The partition scheduler 21 operates every one tick and performs switching (partition scheduling) of TPs. The partition scheduler 21 selects and decides one of TP1 to TP3 to be activated during the next one tick. Further, the partition scheduler 21 starts operation of the task scheduler on the selected TP.

The partition scheduling performed by the partition scheduler 21 will be described in detail. The partition scheduler 21 refers to a scheduling table 22 and performs the partition scheduling in accordance with a scheduling pattern defining a setting of each TP.

The scheduling table 22 holds the scheduling pattern defining the order and timing of switching TPs. For example, the scheduling table 22 is preliminarily stored in the execution memory 11. Note that the scheduling table 22 holds at least two different scheduling patterns. One is a scheduling pattern applied when abnormality detection is not performed by the safety monitoring tasks 26 and 27 (i.e., during normal time). The other is a scheduling pattern applied when an abnormality is detected by the safety monitoring tasks 26 and 27. Hereinafter, the scheduling pattern applied during normal time is called a "normal control scheduling pattern", and the scheduling pattern applied upon detection of an abnormality is called a "safety control scheduling pattern".

Figure 6A:
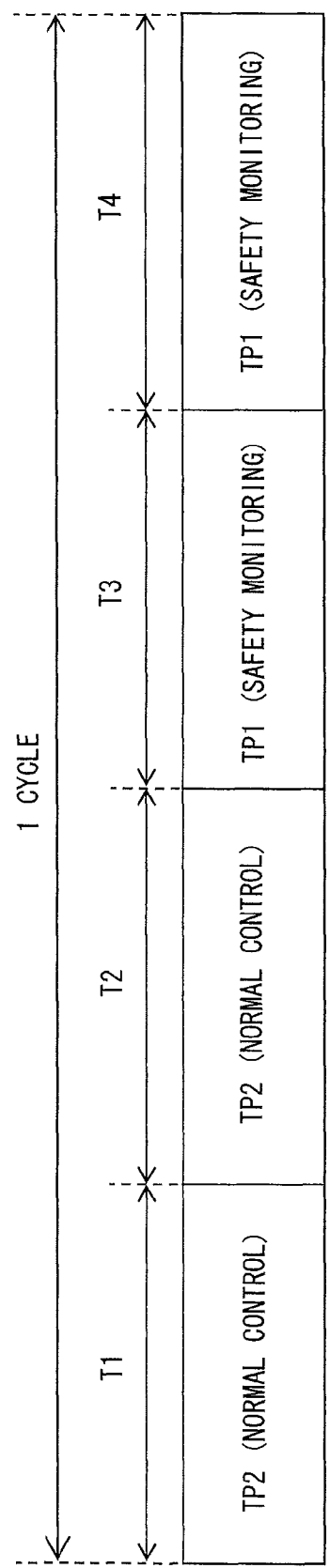
FIG. 6A is a diagram showing a specific example of a scheduling pattern.

FIG. 6A shows a specific example of the normal control scheduling pattern. Referring to FIG. 6A, in a one-cycle time, the normal control time partition TP2 to which the normal control tasks 28 and 29 belong is allocated to the first one tick (T1) and the next one tick (T2), and the safety monitoring time partition TP1 to which the safety monitoring tasks 26 and 27 belong is allocated to the next one tick (T3) and the last one tick (T4). According to the scheduling pattern of FIG. 6A, the normal control tasks 28 and 29 and the safety monitoring tasks 26 and 27 are repeatedly scheduled.

The following description is made assuming that the normal control task 28 operates in T1; the normal control task 29 operates in T2; the safety monitoring task 26 operates in T3; and the safety monitoring task 27 operates in T4. However, the scheduling pattern is not limited thereto. The normal control task 28 and the normal control task 29 may belong to different normal control TPs. The normal control TP to which the normal control task 28 belongs may be allocated to T1, and the normal control TP to which the normal control task 29 belongs may be allocated to T2. Similarly, the safety monitoring task 26 and the safety monitoring task 27 may belong to different safety monitoring TPs. The safety monitoring TP to which the safety monitoring task 26 belongs may be allocated to T3, and the safety monitoring TP to which the safety monitoring task 27 belongs may be allocated to T4. In this case, the task scheduler that manages the tasks belonging to the respective TPs operates in each TP, as a matter of course.

Figure 6B:
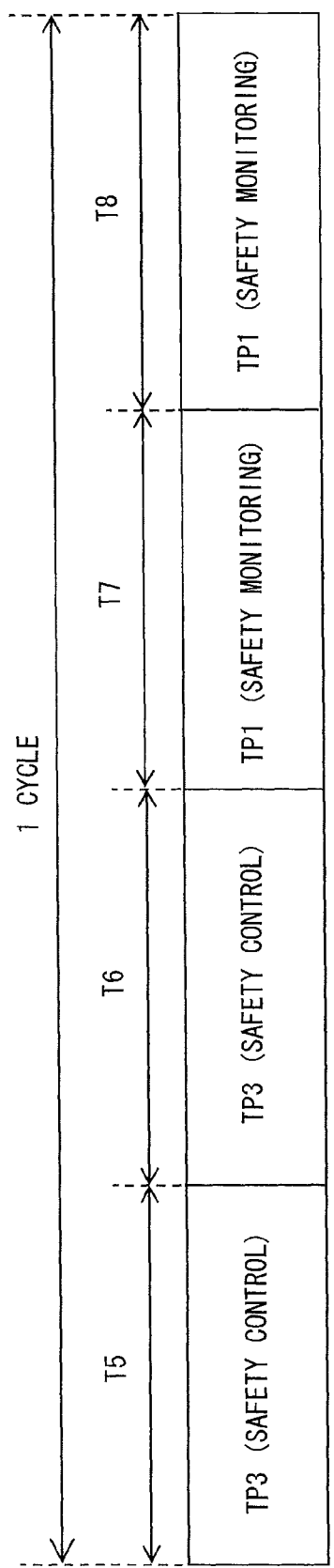
FIG. 6B is a diagram showing a specific example of the scheduling pattern.

FIG. 6B shows a specific example of the safety control scheduling pattern. Referring to FIG. 6B, in a one-cycle time, the safety control time partition TP3 to which the safety control tasks 30 and 31 belong is allocated to the first one tick (T5) and the next one tick (T6), and the safety monitoring time partition TP1 to which the safety monitoring tasks 26 and 27 belong is allocated to the next one tick (T7) and the last one tick (T8). According to the scheduling pattern of FIG. 6B, the safety control tasks 30 and 31 and the safety monitoring tasks 26 and 27 are repeatedly scheduled.

The following description is made assuming that the safety control task 30 operates in T5; the safety control task 31 operates in T6; the safety monitoring task 26 operates in T7; and the safety monitoring task 27 operates in T8. However, the scheduling pattern is not limited thereto. The safety control task 30 and the safety control task 31 may belong to different safety control TPs. The safety control TP to which the safety control task 30 belongs may be allocated to T5, and the safety control TP to which the safety control task 31 belongs may be allocated to T6. Similarly, the safety monitoring task 26 and the safety monitoring task 27 may belong to different safety monitoring TPs. The safety monitoring TP to which the safety monitoring task 26 belongs may be allocated to T7, and the safety monitoring TP to which the safety monitoring task 27 belongs may be allocated to T8. In this case, the task scheduler that manages the tasks belonging to the respective TPs operates in each TP, as a matter of course.

Referring back to FIG. 5, the description will be continued. The task schedulers 23, 24, and 25 schedule tasks within the TPs to which the tasks belong. As the scheduling of tasks within the respective TPs, typical scheduling based on priority may be applied. Though FIG. 5 illustrates that each TP includes only two tasks, each task may include one or three or more tasks.

The safety monitoring tasks 26 and 27 are tasks generated upon activation of the safety monitoring application 101. In the example of FIG. 5, the safety monitoring tasks 26 and 27 are allocated to TP1 and RP1. The safety monitoring tasks 26 and 27 execute monitoring of the running status of each of the normal control tasks 28 and 29, which are non-safety-related applications, monitoring of the running status of each of the safety control tasks 30 and 31, which are safety-related applications, input and output of data to and from the I/O port 12, and monitoring of the input and output data to and from the I/O port 12. Further, the safety monitoring tasks 26 and 27 notify the partition scheduler 21 of the running status of each task.

Specifically, the safety monitoring task 26 controls the motors by outputting the command value, which is supplied from the normal control task 28 or the safety control task 30, to the I/O port 12. The safety monitoring task 26 acquires the data (sensor value), which is measured by a sensor, from the sensor through the I/O port 12. The safety monitoring task 26 provides the normal control task 28 and the safety control task 30 with the acquired sensor value. The safety monitoring task 27 controls the motors by outputting the command value, which is supplied from the normal control task 29 or the safety control task 31, to the I/O port 12. The safety monitoring task 27 acquires the data (sensor value), which is measured by a sensor, from the sensor through the I/O port 12. The safety monitoring task 27 provides the normal control task 29 and the safety control task 31 with the acquired sensor value. For example, the safety monitoring tasks 26 and 27 provide the normal control tasks 28 and 29 and the safety control tasks 30 and 31 with the acquired sensor value by means of an inter-task communication. At this time, the sensor value may be provided through the execution memory 11.

The normal control tasks 28 and 29 are tasks generated upon activation of the normal control application 102. In the example of FIG. 5, the normal control tasks 28 and 29 are allocated to TP2 and RP2. The normal control tasks 28 and 29 perform control for causing a control target, such as a service robot, to execute a normal function/operation. Further, the normal control tasks 28 and 29 notify the partition scheduler 21 of the running status of each task.

Specifically, the normal control task 28 performs calculation for controlling the motors, based on the sensor value supplied from the safety monitoring task 26. The normal control task 28 provides the safety monitoring task 26 with the command value calculated by the control calculation, and instructs the safety monitoring task 26 to output the command value. The normal control task 29 performs calculation for controlling the motors, based on the sensor value supplied from the safety monitoring task 27. The normal control task 29 provides the safety monitoring task 27 with the command value calculated by the control calculation, and instructs the safety monitoring task 27 to output the command value. For example, the normal control tasks 28 and 29 provide the safety monitoring tasks 26 and 27 with the command value by means of an inter-task communication. At this time, the command value may be provided through the execution memory 11. The safety monitoring tasks 26 and 27 output the command value to the I/O port 12, upon acquisition of the command value from the normal control tasks 28 and 29.

The safety control tasks 30 and 31 are tasks generated upon activation of the safety control application 103. In the example of FIG. 5, the safety control tasks 30 and 31 are allocated to TP3 and RP3. The safety control tasks 30 and 31 perform a control procedure prescribed to ensure functional safety in a case where some abnormality is detected. Further, the safety control tasks 30 and 31 notify the partition scheduler 21 of the running status of each task.

Specifically, the safety control task 30 performs calculation for controlling the motors, based on the sensor value supplied from the safety monitoring task 26. The safety control task 30 provides the safety monitoring task 26 with the command value calculated by the control calculation, and instructs the safety monitoring task 26 to output the command value. The safety control task 31 performs calculation for controlling the motors, based on the sensor value supplied from the safety monitoring task 27. The safety control task 31 provides the safety monitoring task 27 with the command value calculated by the control calculation, and instructs the safety monitoring task 27 to output the command value. For example, the safety control tasks 30 and 31 provide the safety monitoring tasks 26 and 27 with the command value by means of an inter-task communication. At this time, the command value may be provided through the execution memory 11. The safety monitoring tasks 26 and 27 output the command value to the I/O port 12, upon acquisition of the command value from the safety control tasks 30 and 31.

Note that various techniques may be employed as a specific configuration for notifying results from each task to the partition 21. For example, a task may invoke a system call (service call) of the OS 100, and results may be notified to the partition scheduler 21 through the OS 100. Alternatively, assuming that a flag related to the running status of a task is stored in the execution memory 11, for example, the task may set the value of the flag according to the running status of the task, and the partition scheduler 21 may judge the running status of the task according to the set value of the flag.

As described above, the partition scheduler 21 operates every one tick, and selects and decides one of TP1 to TP3 to be activated. Further, the partition scheduler 21 starts operation of the task scheduler on the selected TP. The task schedulers 23, 24, and 25 start operation to carry out task scheduling, and the processor 10 executes the tasks in the TP in the order of the tasks scheduled by the task schedulers 23, 24, and 25. Thus, the application allocated to the active TP is executed by the processor 10.

The partition scheduling performed by the partition scheduler 21 will be described below with reference to FIG. 7. FIG. 7 is a flowchart showing a specific example of the partition scheduling procedure of the partition scheduler 21.

FIG. 7 illustrates an example in which scheduling is executed according to the normal control scheduling pattern shown in FIG. 5A and the safety control scheduling pattern shown in FIG. 5B.

Hereinafter, the period (T1) in which TP2 is allocated and the normal control task 28 operates is referred to as "T2-1", and the period (T2) in which TP2 is allocated and the normal control task 29 operates is referred to as "T2-2". The period (T3, T7) in which TP1 is allocated and the safety monitoring task 26 operates is referred to as "T1-1", and the period (T4, T8) in which TP1 is allocated and the safety monitoring task 27 operates is referred to as "T1-1". The period (T5) in which TP3 is allocated and the safety control task 30 operates is referred to as "T3-1", and the period (T6) in which TP3 is allocated and the safety control task 31 operates is referred to as "T3-2".

In the following description, an example will be described in which the safety monitoring task 26, the normal control task 28, and the safety control task 30 execute processing related to control of the motor of the left wheel 201, and the safety monitoring task 27, the normal control task 29, and the safety control task 31 execute processing related to control of the motor of the right wheel 202. However, the safety monitoring task 26, the normal control task 28, the safety control task 30 may execute processing related to control of the motor of the right wheel 202, and the safety monitoring task 27, the normal control task 29, and the safety control task 31 may execute processing related to control of the motor of the left wheel 201.

First, assume that no abnormality is detected by the safety monitoring tasks 26 and 27 and the operation is carried out based on the normal control scheduling pattern. The description starts from the point where the partition scheduler 21 starts the TP scheduling operation upon generation of a carrier interrupt and the active TP is switched to TP2 based on the normal control scheduling pattern (S1). Assume that the period of this TP is represented by "T2-1".

The partition scheduler 21 causes the task scheduler 24, which belongs to the activated TP2, to operate. The task scheduler 24 having started operation executes the tasks in TP2 according to priority. Then, the normal control task 28, the execution of which has been started by the task scheduler 24, acquires a sensor value related to the motor of the left wheel 201 from the safety monitoring task 26, and performs control calculation based on the acquired sensor value, thereby calculating a command value for the motor of the left wheel 201 (S2). The normal control task 28 outputs the calculated command value to the safety monitoring task 26.

The partition scheduler 21 starts the TP scheduling operation upon generation of the subsequent carrier interrupt, and switches the active TP to TP2 based on the normal control scheduling pattern (S3). That is, TP2 is maintained as the active TP. Note that the period of this TP is represented by "T2-2".

The partition scheduler 21 causes the task scheduler 24, which belongs to the activated TP2, to operate. The task schedule 24 having started operation executes the tasks in TP2 according to priority. Then, the normal control task 29, the execution of which has been started by the task scheduler 24, acquires a sensor value related to the motor of the right wheel 202 from the safety monitoring task 27, and performs control calculation based on the acquired sensor value, thereby calculating a command value for the motor of the right wheel 202 (S4). The normal control task 29 outputs the calculated command value to the safety monitoring task 27.

The partition scheduler 21 starts the TP scheduling operation upon generation of a subsequent carrier interrupt, and switches the active TP from TP2 to TP1 based on the normal control scheduling pattern (S5). Note that the period of this TP is represented by "T1-1".

The partition scheduler 21 causes the task scheduler 23, which belongs to the activated TP1, to operate. The task scheduler 23 having started operation executes the tasks in TP1 according to priority. Accordingly, the safety monitoring task 26 starts operation (S6). The safety monitoring task 26, the execution of which has been started by the task scheduler 23, performs monitoring of the running status of the normal control task 28 and monitoring of the input and output data to and from the I/O port 12, and judges whether these are normal (S7). For example, the safety monitoring task 26 acquires the command value output from the normal control task 28, and judges whether or not the acquired command value falls within a normal range. When the command value falls within the normal range, the safety monitoring task 26 judges that the input and output data to and from the I/O port 12 is normal. When the command value does not fall within the normal range, the safety monitoring task 26 judges that the input and output data to and from the I/O port 12 is abnormal.

When it is determined as normal (S7: Yes), the safety monitoring task 26 performs an output to the external device (S8). Specifically, the safety monitoring task 26 outputs the command value acquired from the normal control task 28 to the I/O port 12 as the command value for the motor of the left wheel 201.

The partition scheduler 21 starts the TP scheduling operation upon generation of a subsequent carrier interrupt, and switches the active TP to TP1 based on the normal control scheduling pattern (S9). That is, TP1 is maintained as the active TP. Note that the period of this TP is represented by "T1-2".

The partition scheduler 21 causes the task scheduler 23, which belongs to the activated TP1, to operate. The task scheduler 23 having started the operation executes tasks in TP1 according to priority. Accordingly, the safety monitoring task 27 starts operation (S10). Then, the safety monitoring task 27, the execution of which has been started by the task scheduler 23, performs monitoring of the running status of the normal control task 29 and monitoring of the input and output data to and from the I/O port 12, and judges whether these are normal (S11). For example, the safety monitoring task 27 acquires the command value output from the normal control task 29, and judges whether the acquired command value falls within the normal range. When the command value falls within the normal range, the safety monitoring task 27 judges that the input and output data to and from the I/O port 12 is normal. When the command value does not fall within the normal range, the safety monitoring task 27 judges that the input and output data to and from the I/O port 12 is abnormal.

When it is determined as normal (S11: Yes), the safety monitoring task 27 performs an output to the external device (S12). Specifically, the safety monitoring task 27 outputs the command value acquired from the normal control task 29 to the I/O port 12 as the command value for the motor of the right wheel 202.

At this point, the one-cycle time in the normal control scheduling pattern ends. Accordingly, upon generation of a subsequent carrier interrupt, the process is resumed from step S1.

On the other hand, in steps S7 and S11, when it is determined as abnormal (S7: No, S11: No), the safety monitoring task 26 or the safety monitoring task 27 notifies the partition scheduler 21 of the result. Then, the partition scheduler 21 switches the scheduling pattern, which is used for scheduling TPs, from the normal control scheduling pattern to the safety control scheduling pattern, upon notification of the judgment of abnormality from the safety monitoring task 26 or the safety monitoring task 27 (S13).

That is, after that, in the same manner as in the above-described processing, the partition scheduler 21 executes TP scheduling in the order of "TP3-1", "TP3-2", "TP1-1", and "TP1-2", upon generation of a carrier interrupt.

At this time, the safety control tasks 30 and 31 calculate a command value for generating the PWM signal that causes the inverted two-wheel vehicle 200 to be abnormally stopped while performing an inversion control, based on the sensor values acquired from the safety monitoring tasks 26 and 27, for example. Specifically, the safety control task 30 calculates the command value for the motor of the left wheel 201, and the safety control task 31 calculates the command value for the motor of the right wheel 202.

Figure 8:
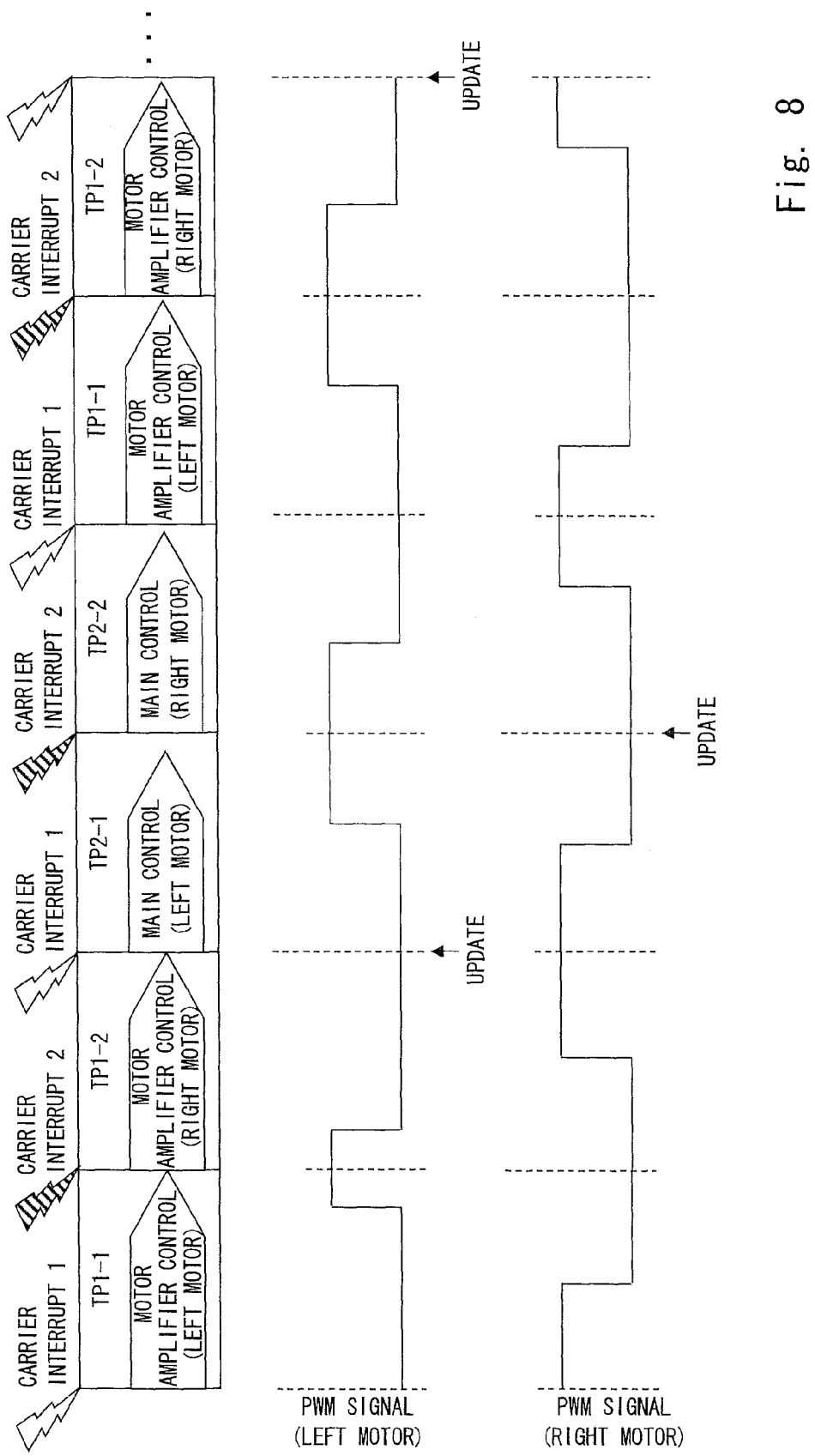
FIG. 8 is a diagram showing active time partitions and a variation of each PWM signal.

According to the procedure described above, it is possible to achieve the control of the control target in synchronization with the cycle of the carrier signal in the PWM control. The operation will be described with reference to FIG. 8. FIG. 8 is a diagram showing active TPs and a variation of each PWM signal in the above-described procedure.

As shown in FIG. 8, a carrier interrupt is generated every one cycle of each of two carrier signals. Herein, the carrier interrupt generated based on the carrier signal from the transmitter 16 is referred to as "carrier interrupt 1", and the carrier interrupt generated based on the carrier signal from the transmitter 18 is referred to as "carrier interrupt 2". Assume that the carrier signal which is supplied from the transmitter 16 and causes "carrier interrupt 1" to be generated is used to generate the PWM signal for the motor of the left wheel 201 of the inverted two-wheel vehicle 200, and the carrier signal which is supplied from the transmitter 18 and causes "carrier interrupt 2" to be generated is used to generate the PWM signal for the motor of the right wheel 202 of the inverted two-wheel vehicle 200.

First, in TP1-1, the safety monitoring task 26 updates the command value for the motor of the left wheel 201. As described above, the PWM signal is updated every one cycle of the carrier signal. Accordingly, in the I/O port 12, the PWM signal for the motor of the left wheel 201 is updated based on the updated command value in the next one cycle (TP2-1 to TP2-2) of the carrier signal from the transmitter 16. That is, in the carrier signal, the command value is reflected in the PWM signal in the cycle subsequent to the cycle in which the command value is updated.

In TP1-2, the safety monitoring task 27 updates the command value for the motor of the right wheel 202. Accordingly, in the I/O port 12, the PWM signal for the motor of the right wheel 202 is updated based on the updated command value in the next one cycle (TP2-2 to TP1-1) of the carrier signal from the transmitter 18. That is, in the carrier signal, the command value is reflected in the PWM signal in the cycle subsequent to the cycle in which the command value is updated.

In this manner, the normal control tasks 28 and 29 belonging to TP2 generate command values by control calculation, and perform a main control for instructing the safety monitoring tasks 26 and 27 to output the generated command values. In the next one cycle of the carrier signal, the safety monitoring tasks 26 and 27 belonging to TP1 perform a motor amplifier control for outputting the command values, which are supplied from the normal control tasks 28 and 29, to the I/O port 12. In the next one cycle of the carrier signal, the control contents indicated by the command values are reflected in the PWM signal through the I/O port 12. Note that this one cycle overlaps the cycle in which the main control is carried out. Thus, it is possible to control the control target in synchronization with the carrier signal.

Figure 9:
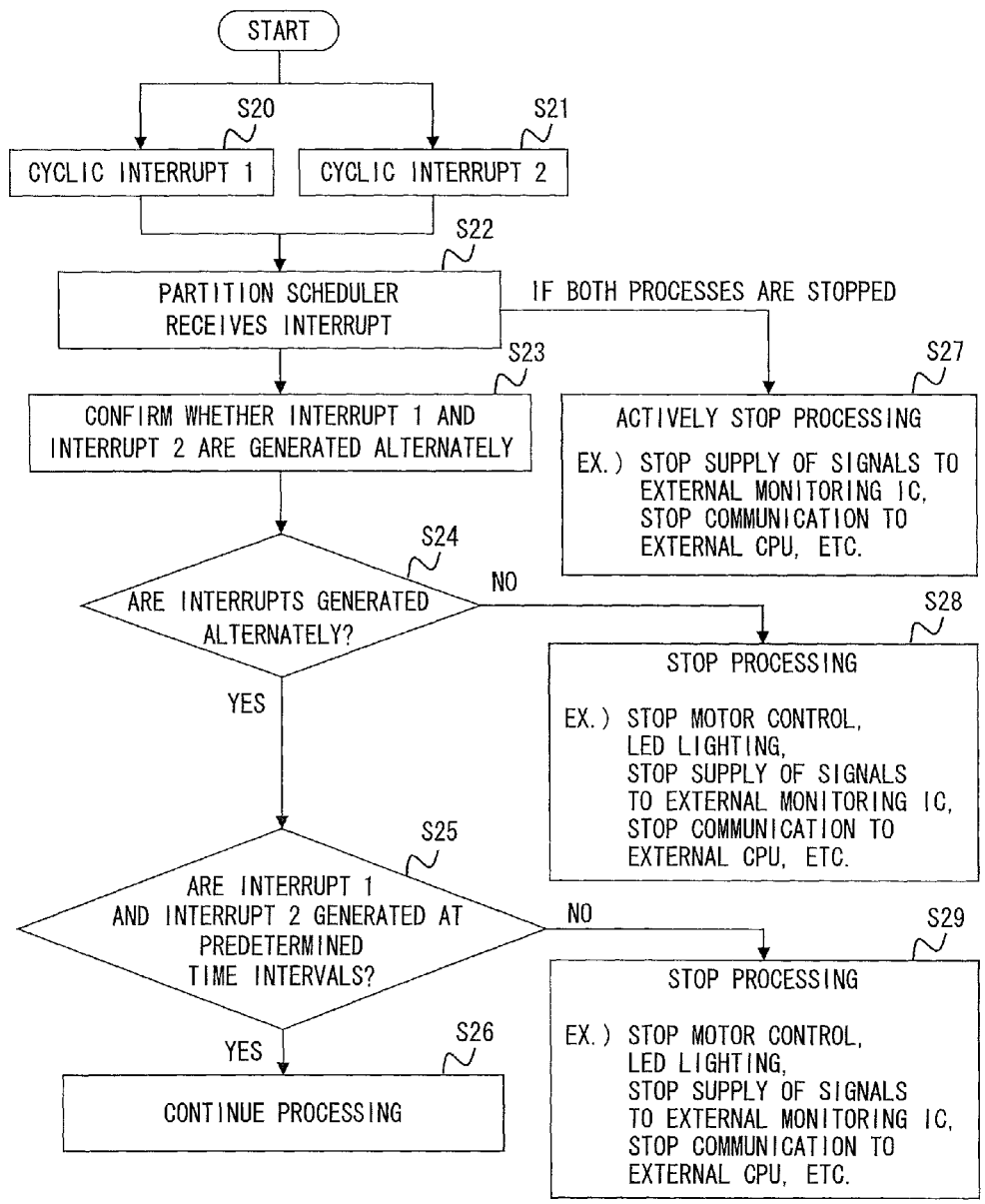
FIG. 9 is a flowchart showing a specific example of a carrier interrupt abnormality detection procedure carried out by the partition scheduler.

The detection of an abnormality of a carrier interrupt by the partition scheduler 21 will be described below with reference to FIG. 9. FIG. 9 is a flowchart showing a specific example of a carrier interrupt abnormality detection procedure carried out by the partition scheduler 21.

Upon generation of cyclic carrier interrupts from the interrupt signal generation circuit 17 and the interrupt signal generation circuit 19 (S20, S21), the partition scheduler 21 receives these carrier interrupts and starts operation (S22). In other words, the processor 10 executes the partition scheduler 21 every time a cyclic carrier interrupt is generated to the processor 10 from each of the interrupt signal generation circuit 17 and the interrupt signal generation circuit 19.

The partition scheduler 21 determines whether the carrier interrupt from the interrupt signal generation circuit 17 and the carrier interrupt from the interrupt signal generation circuit 19 are generated alternately (S23). For example, upon receiving an interrupt signal, the partition scheduler 21 stores, into the execution memory 11, information indicating the interrupt signal generation circuit having output the interrupt signal. Then, upon receiving a subsequent interrupt signal, the partition scheduler 21 compares the interrupt signal generation circuit having output the interrupt signal with the interrupt signal generation circuit indicated by the information stored in the execution memory. When the interrupt signal generation circuits are not identical with each other, it is determined that the carrier interrupts are generated alternately, and when the interrupt signal generation circuits are identical with each other, it is determined that the carrier interrupts are not generated alternately. The interrupt signal generation circuit having output the interrupt signal may be specified in the following manner. That is, an interrupt signal input terminal of the processor 10 is preliminarily linked to the interrupt signal generation circuit that outputs the interrupt signal to the interrupt signal input terminal, and the interrupt signal generation circuit is specified from the interrupt signal input terminal having received the interrupt signal.

When it is determined that the carrier interrupts are generated alternately (S23: Yes), the partition scheduler 21 determines whether the carrier interrupt from the interrupt signal generation circuit 17 and the carrier interrupt from the interrupt signal generation circuit 19 are generated at predetermined time intervals (S25). In this exemplary embodiment, as described above, an expected value of the time interval at which each carrier interrupt is generated is a time corresponding to a half cycle of the carrier signal.

This enables determination while separately providing a timer for measuring time in the microcontroller 15, for example. Specifically, when a carrier interrupt is generated, the partition scheduler 21 acquires, from the timer, the time when the carrier interrupt is generated. Information indicating the acquired generation time is stored in the execution memory 11 so that the information can be used upon generation of a subsequent carrier interrupt. The partition scheduler 21 calculates the time from the generation of the previous carrier interrupt to the generation of the current carrier interrupt, based on the generation time of the current carrier interrupt acquired from the timer and the generation time of the previous carrier interrupt stored in the execution memory 11. The partition scheduler 21 determines whether the calculated time matches a predetermined time (time corresponding to a half cycle of the carrier signal). The determination may be made in such a manner that information indicating the time (time corresponding to a half cycle of the carrier signal) as the expected value is preliminarily stored in the execution memory 11 and the time indicated by the information and the calculated time are compared with each other. Matching of the calculated time with the time of the expected value is not limited to complete matching, but also includes matching within a predetermined error range.

When it is determined that the carrier interrupts are generated at predetermined time intervals (S25: Yes), the partition scheduler 21 continues the processing. That is, as described above with reference to FIG. 7, the partition scheduler 21 executes partition scheduling and continuously controls the control target.

On the other hand, when a failure occurs in both the interrupt signal generation circuit 17 and the interrupt signal generation circuit 19 and the output of the interrupt signal is stopped, the processing related to the control of the control target is actively stopped (S27). That is, since the carrier interrupt which triggers the operation of the partition scheduler 21 is not generated, the partition scheduling is not carried out by the partition scheduler 21 and the processing related to the control of the control target is actively stopped.

In this case, the safety is further improved by carrying out at least one of the following processes:
(1) stopping supply of signals to an external monitoring IC (reset circuit 14); and
(2) stopping communication to an external CPU.
(1) In the Case of Stopping Supply of Signals to an External Monitoring IC (Reset Circuit 14)

In this case, the operation of the partition scheduler 21 is stopped, so that the transmit signal from the partition scheduler 21 to the reset circuit 14 is interrupted. Accordingly, the reset circuit 14 resets the microcontroller 15, upon detection of the interruption of the transmitted signal from the partition scheduler 21. For example, when the transmit signal is not transmitted from the partition scheduler 21 for a predetermined period of time longer than one tick, the reset circuit 14 determines that the transmit signal is interrupted.

When the operation of the partition scheduler 21 is stopped and partition scheduling is stopped, the I/O port 12 continuously outputs, to the motor, the PWM signal based on the command values from the safety monitoring tasks 26 and 27 which are last operated. On the other hand, the reset circuit 14 resets the microcontroller 15, thereby stopping the supply of the PWM signal to the motors and bringing the motors into a free state (non-excitation state). This allows the motor control of the inverted two-wheel vehicle 200 to be stopped and prevents unscheduled control of the motors from being continued, thereby further improving the safety.

After that, when the microcontroller 15 restarts and the partition scheduler 21 starts operation normally, the control of the inverted two-wheel vehicle 200 may be resumed.
(2) In the Case of Stopping Communication to an External CPU The process of stopping the motor control to ensure the safety as described above may be carried out by an external CPU (not shown) which is provided outside the microcontroller 15 in the safety controller 1. Instead of the reset circuit 14, the safety controller 1 may include the external CPU.

Alternatively, the reset circuit 14 as well as the safety control controller 1 may include the external CPU.

In this case, the partition scheduler 21 periodically transmits the transmit signal to the external CPU. For example, the partition scheduler 21 transmits the transmit signal at the timing when the partition scheduler 21 operates every one tick. In this configuration, when the operation of the partition scheduler 21 is stopped as described above, the transmit signal from the partition scheduler 21 to the external CPU is interrupted. Accordingly, the external CPU interrupts, in a circuit manner, the PWM signal supplied to the motor from the microcontroller 15 (I/O port 12), upon detection of the interruption of the transmit signal from the partition scheduler 21. This may be implemented in such a manner that a switch circuit is provided between the microcontroller 15 and the motors and the external CPU switches the switch circuit to interrupt an electrical connection between the microcontroller 15 and the motors, for example. Further, when the transmit signal is not transmitted from the partition scheduler 21 for a predetermined period of time longer than one tick, the reset circuit 14 determines that the transmit signal is interrupted, the external CPU determines that the transmit signal is interrupted.

This configuration allows the supply of the PWM signal to the motors to be stopped and brings the motors into a free state (non-excitation state). This allows the motor control of the inverted two-wheel vehicle 200 to be stopped and prevents unscheduled control of the motors from being continued, thereby further improving the safety.

On the other hand, when it is determined that the carrier interrupts are not generated alternately (S24: No), and when it is determined that the carrier interrupts are not generated at predetermined time intervals (S25: No), the partition scheduler 21 stops the processing related to the control of the control target (S28, S29).

In this case, the safety is further improved by carrying out at least one of the following processes (1) to (3). In addition to the following processes (1) to (3), the process (4) may also be carried out.
(1) Stopping motor control
(2) Stopping supply of signals to an external monitoring IC (reset circuit 14)
(3) Stopping communication to an external CPU
(4) LED lighting
(1) Stopping Motor Control In this case, the partition scheduler 21 voluntarily stops the supply of the PWM signal to the motors and brings the motors into a free state (non-excitation state), thereby stopping the motor control of the inverted two-wheel vehicle 200.

For example, the partition scheduler 21 may notify the safety monitoring tasks 26 and 27 of an instruction to stop the motors. Thereafter, in response to the notification, the safety monitoring tasks 26 and 27 may output, to the I/O port 12, a command value in a fixed manner to stop the supply of the PWM signal. Alternatively, for example, the partition scheduler 21 may notify the normal control tasks 28 and 29 and the safety control tasks 30 and 31 of an instruction to stop the motors. Thereafter, in response to the notification, the normal control tasks 28 and 29 and the safety control tasks 30 and 31 may generate a command value in a fixed manner to stop the supply of the PWM signal. These configurations can bring the motors into a free state (brake-off state).
(2) Stopping Supply of Signals to an External Monitoring IC (Reset Circuit 14)
(3) Stopping Communication to an External CPU In this case, when the partition scheduler 21 voluntarily stops transmitting the transmit signal to the reset circuit 14 or the external CPU, processing similar to step S27 described above is executed. The contents of the processing are similar to those described above, so the detailed description thereof is omitted. Note that the partition scheduler 21 may transmit a rest signal (stop instruction signal) to the reset circuit 14 to thereby reset the microcontroller 15. Further, the partition scheduler 21 may output the signal (stop instruction signal) to instruct interruption of the supply of the PWM signal to the external CPU, and the external CPU may interrupt the supply of the PWM signal according to the output of the signal.
(4) LED Lighting LED lighting may be performed in addition to stopping of the motor control in the above-mentioned processes (1) to (3). For example, an LED may be provided at an arbitrary position of the inverted two-wheel vehicle 200 and the LED may be turned on to notify a passenger of the inverted two-wheel vehicle 200 of occurrence of an abnormality.

In place of the LED, or in addition to the LED, a display panel may be provided at an arbitrary position of the inverted two-wheel vehicle 200, and an image to notify an abnormality may be displayed on the display panel to thereby notify the passenger of the inverted two-wheel vehicle 200 of occurrence of the abnormality.

In place of the LED, or in addition to the LED, a speaker may be provided at an arbitrary position of the inverted two-wheel vehicle 200, and a sound to notify an abnormality may be output from the speaker to thereby notify the passenger of the inverted two-wheel vehicle 200 of occurrence of the abnormality.

An LED, a display panel, a speaker, or the like is preferably provided at a portion of the handle 203 of the inverted two-wheel vehicle 200 so as to be easily viewed by the passenger, for example.

The above description exemplifies the case where all the three types of processes of stopping the control of the control target, i.e., stopping the control of the control target upon stopping the output of the interrupt signal (S27), stopping the control of the control target upon occurrence of an abnormality in the output order of interrupt signals (S24: No, S28), and stopping the control of the control target upon occurrence of an abnormality in the output time interval of interrupt signals (S25: No, S29), are carried out. However, the processes are not limited thereto. At least one of the three types of processes of stopping the control of the control target may be carried out. That is, one of the determinations in steps S24 and S25 may be carried out.

As described above, when it is detected, as an abnormality related to the first interrupt signal and the second interrupt signal (corresponding to the interrupt signals output from the interrupt signal generation circuits 17 and 19), that the first interrupt signal and the second interrupt signal are not output in the predetermined order (corresponding to step S24 described above), the control of the control target is stopped (corresponding to step S28 described above). In this configuration, when the first interrupt signal and the second interrupt signal, which trigger switching of time partitions, are not output in the predetermined order and the processing related to the control of the control target is not carried out as scheduled, the control of the control target is stopped. This further improves the safety.

Because the first interrupt signal and the second interrupt signal are generated in synchronization with a first carrier signal and a second carrier signal (corresponding to the carrier signals output from the transmitters 16 and 18) having a phase difference, the time interval of switching time partitions can be shortened. That is, the high-speed control of the control target can be maintained.

Figure 10:
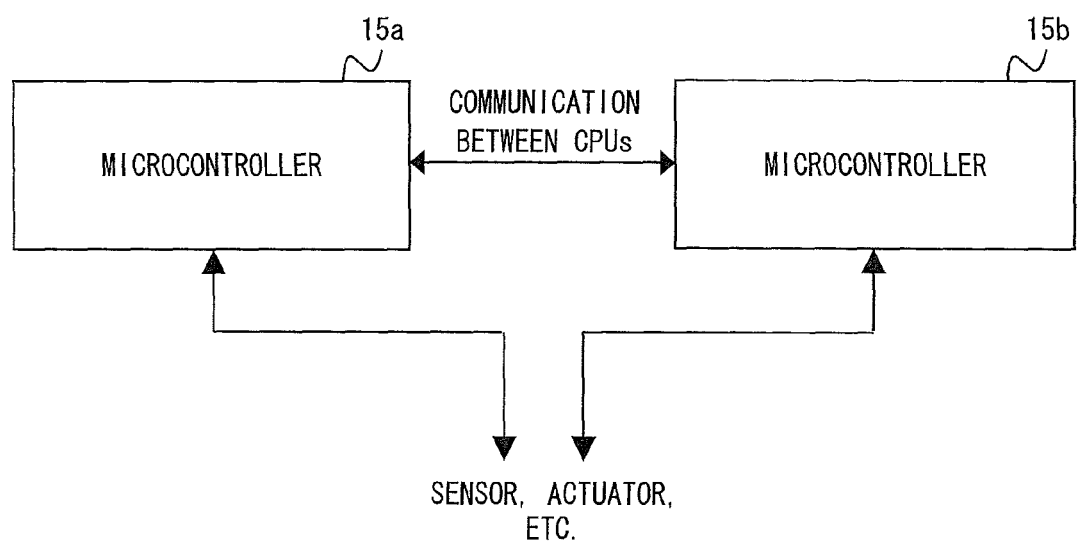
FIG. 10 is a block diagram showing a configuration example of a safety controller according to another exemplary embodiment of the invention.

Although the above exemplary embodiment has described that an external CPU may be provided, this external CPU (external processor) may be the processor 10 of another microcontroller 15 obtained when the microcontroller 15 is made redundant. As shown in FIG. 10, for example, the microcontroller 15 may have a redundant configuration. FIG. 10 illustrates an example of the redundant configuration in which the microcontroller 15 is duplicated into a 0-system microcontroller 15a and a 1-system microcontroller 15b, but the microcontroller 15 may have a redundant configuration including three or more microcontrollers.

Each of the microcontrollers 15a and 15b periodically transmits the transmit signal to the other microcontroller. For example, the partition scheduler 21 transmits the transmit signal at the timing when the partition scheduler 21 operates every one tick, and receives the transmit signal from the other microcontroller. In the case shown in FIG. 10, the microcontroller 15a transmits the transmit signal to the microcontroller 15b of the other system, and the microcontroller 15b transmits the transmit signal to the microcontroller 15a of the other system.

Accordingly, for example, when the operation of the partition scheduler 21 of the microcontroller 15a is stopped due to a failure in the interrupt signal generation circuits 17 and 19 of the microcontroller 15a, the transmit signal from the partition scheduler 21 of the microcontroller 15a to the microcontroller 15b is interrupted. Upon detection of the interruption of the transmit signal from the microcontroller 15a, the partition scheduler 21 of the microcontroller 15b interrupts, in a circuit manner, the PWM signal to be supplied to the motors from the microcontroller 15a (I/O port 12). Upon detection of the interruption of the transmit signal from the microcontroller 15a, the partition scheduler 21 of the microcontroller 15b may output a signal for resetting the microcontroller 15a to the microcontroller 15a to reset the microcontroller 15a in the same manner as in the reset circuit 14. In the same manner as described above, this configuration prevents unscheduled control of the motors from being continued, thereby further improving the safety.

At this time, the partition scheduler 21 of the microcontroller 15b may cause the inverted two-wheel vehicle 200 to be abnormally stopped while performing an inversion control, as described above, by switching the scheduling pattern for use in TP scheduling from the normal control scheduling pattern to the safety control scheduling pattern. This configuration enables the inverted two-wheel vehicle 200 to be stopped while being controlled, thereby further improving the safety.

Figure 11:
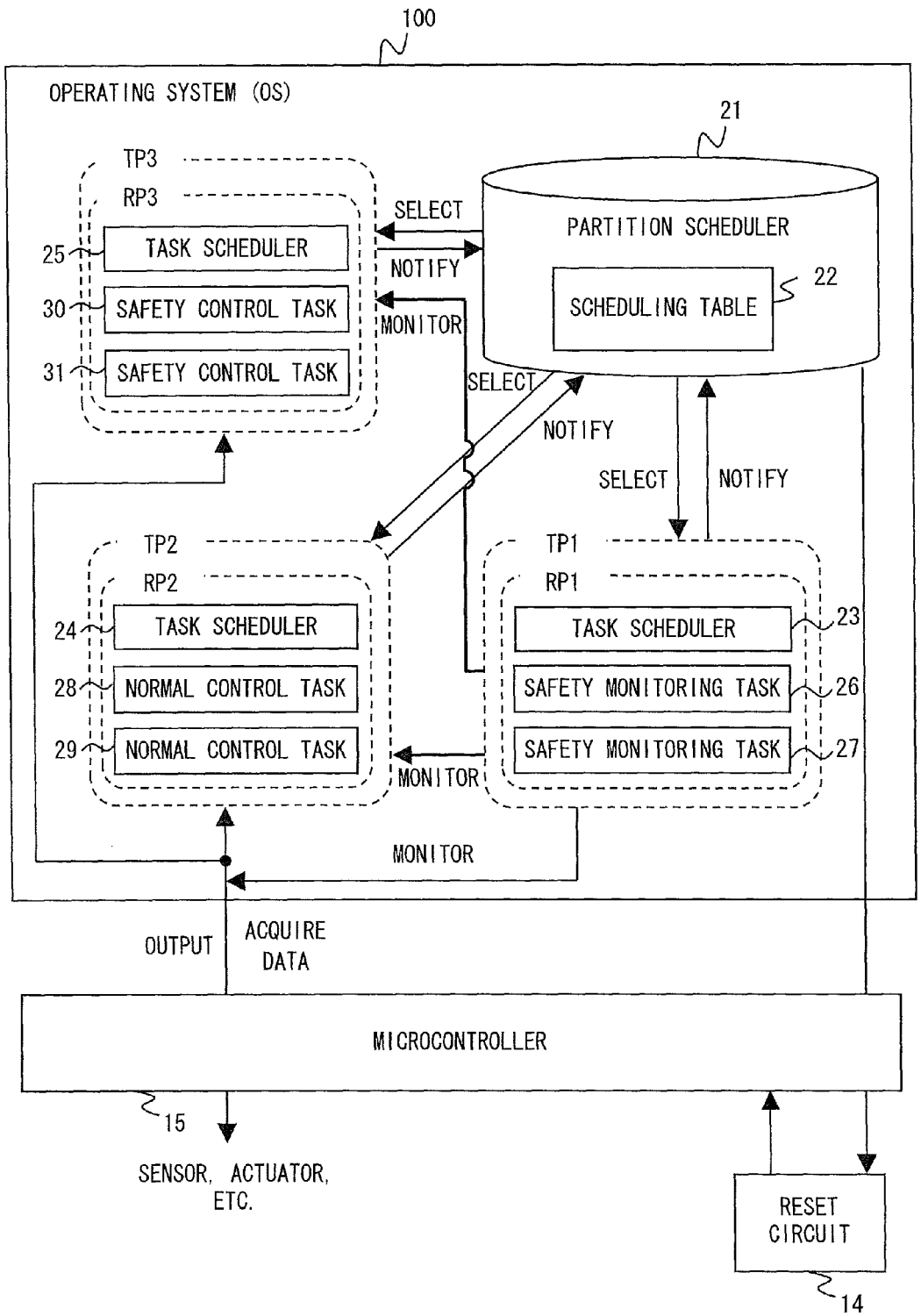
FIG. 11 is a diagram showing relationships between a partition scheduler and tasks according to another exemplary embodiment of the invention.
Figure 12:
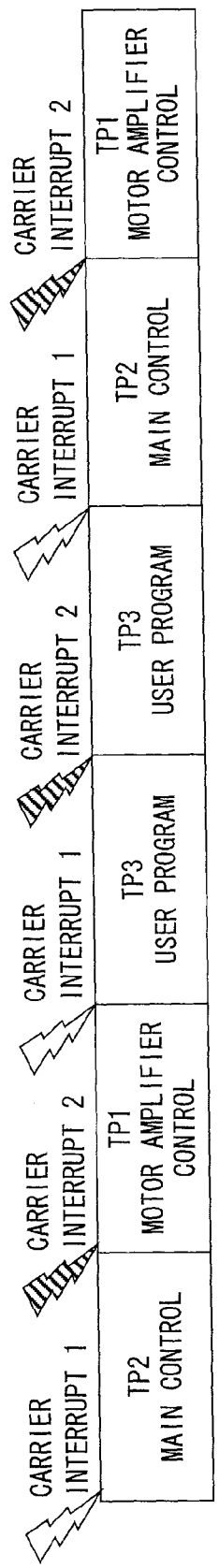
FIG. 12 is a diagram showing an example of switching time partitions according to a carrier interrupt under normal conditions.
Figure 13:
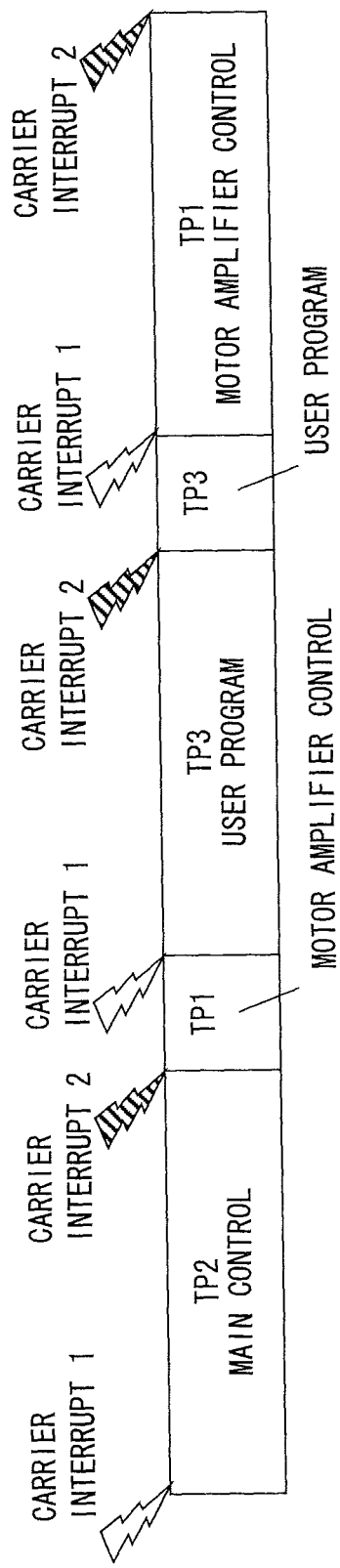
FIG. 13 is a diagram showing an example of switching time partitions according to a carrier interrupt under abnormal conditions.
Figure 14:
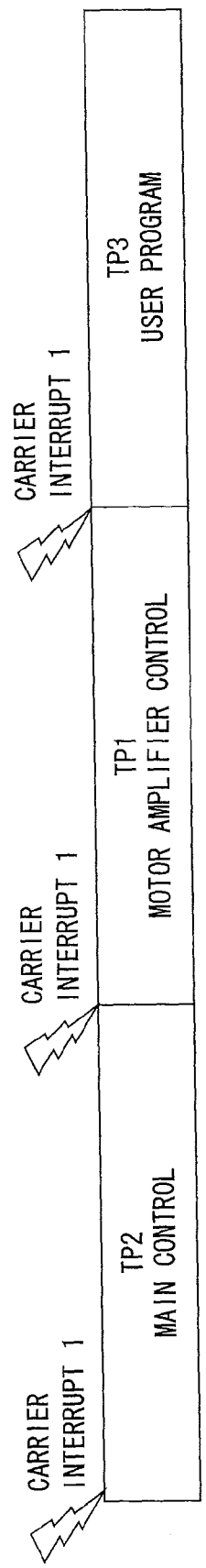
FIG. 14 is a diagram showing an example of time partitioning switching according to a carrier interrupt under abnormal conditions.

The above exemplary embodiment illustrates an example in which TPs accessing the I/O port 12 are integrated into TP1, but the TPs are not limited thereto. For example, as shown in FIG. 11, the normal control tasks 28 and 29 in TP2 and the safety control tasks 30 and 31 in TP3 may perform control calculation, as well as an output of a command value to the I/O port 12 and acquisition of a sensor value through the I/O port 12. In this case, the safety monitoring tasks 26 and 27 in TP1 need not exchange the sensor value and the command value with the normal control tasks 28 and 29 and the safety control tasks 30 and 31. The safety monitoring tasks 26 and 27 execute monitoring of the running status of each of the tasks 28 to 31 and monitoring of data input and output between each of the tasks 28 to 31 and the I/O port 12. Upon detection of an abnormality, the safety monitoring tasks 26 and 27 notifies the partition scheduler 21 of the determination as to the abnormality, with the switching to the safety control scheduling pattern as a trigger.

The present invention is not limited to the above-described exemplary embodiments, but can be modified in various manners without departing from the scope of the present invention described above.

The exemplary embodiments described above illustrate cases where the OS includes TP1 to TP3, but the type and number of TPs are not limited thereto. Also, the scheduling patterns are not limited to those illustrated in the exemplary embodiments described above, and the type and number of tasks belonging to TPs are not limited to those illustrated.

The exemplary embodiments described above illustrate cases where an interrupt signal is generated every one cycle of a carrier signal, as a cycle synchronous with the carrier signal, but the interrupt signal is not limited thereto. For example, an interrupt signal may be generated every predetermined number of cycles (for example, every two cycles) of the carrier signal, as a cycle synchronous with the carrier signal. Also in this configuration, the main control is performed based on a carrier signal having a speed (for example, a cycle of 30 μsec) higher than a clock signal (for example, a cycle of 1 msec) which is generally used for a main control ECU. As a result, a delay in instruction of a control content with respect to a control cycle can be significantly reduced. That is, an interrupt signal may be generated every predetermined number of cycles other than one cycle.

The exemplary embodiments described above illustrate examples in which the phases of two carrier signals (two interrupt signals) are shifted from each other by a half cycle, but the phase shift is not limited thereto. When a phase shift different from the phase shift of a half cycle is set, the determination using a time corresponding to the phase shift as an expected value may be made in step S25 described above. For example, assume that in two carrier interrupts (referred to as "carrier interrupt 1" and "carrier interrupt 2"), "carrier interrupt 2" is generated with a delay of a ¾ cycle of the carrier signal with respect to "carrier interrupt 1". In this case, when a time period from the time when "carrier interrupt 1" is generated to the time when "carrier interrupt 2" is generated is equal to a time period corresponding to a ¾ cycle of the carrier signal, the partition scheduler 21 determines that the carrier interrupts are generated at the predetermined time intervals. When a time period from the time when "carrier interrupt 2" is generated to the time when "carrier interrupt 2" is generated is equal to a time period corresponding to a ¼ cycle of the carrier signal, the partition scheduler 21 determines that the carrier interrupts are generated at the predetermined time intervals.

The above exemplary embodiments described above illustrate cases where two transmitters and two interrupt signal generation circuits are provided, but the number of transmitters and interrupt signal generation circuits is not limited thereto. The safety controller may include three or more transmitters and three or more interrupt signal generation circuits. In this case, in step S23 described above, it may be determined whether the carrier interrupts are generated in an expected order from the interrupt signal generation circuits, instead of determining whether the carrier interrupts are generated alternately from the interrupt signal generation circuits. In other words, it may be determined whether the interrupt signals are output in an expected predetermined order, depending on the configuration of each of the transmitters and the interrupt signal generation circuits.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A safety controller comprising:
   a first carrier signal generation unit that generates a first carrier signal defining a control cycle of a control target;
   a second carrier signal generation unit that generates a second carrier signal defining a control cycle of the control target, the first carrier signal and the second carrier signal having the same cycle and a predetermined phase difference;
   a first interrupt signal output unit that outputs a first interrupt signal in a cycle synchronous with the cycle of the first carrier signal generated by the first carrier signal generation unit;
   a second interrupt signal output unit that outputs a second interrupt signal in a cycle synchronous with the cycle of the second carrier signal generated by the second carrier signal generation unit; and
   a control unit that executes a plurality of tasks for executing processing related to control of the control target and controls the control target by switching and scheduling a plurality of time partitions according to an output of the first interrupt signal from the first interrupt signal output unit and an output of the second interrupt signal from the second interrupt signal output unit, at least one of the plurality of tasks being allocated to each of the plurality of time partitions,
   wherein the control unit stops the control of the control target upon detecting, as an abnormality related to the first interrupt signal and the second interrupt signal, a fact that the first interrupt signal and the second interrupt signal are not output in a predetermined order.

2. The safety controller according to claim 1, wherein the control unit further detects, as an abnormality related to the first interrupt signal and the second interrupt signal, a fact that a time period from the output of the first interrupt signal to the output of the second interrupt signal is different from a predetermined expected value.

3. The safety controller according to claim 1, further comprising:
   a control circuit including the first carrier signal generation unit, the second carrier signal generation unit, the first interrupt signal output unit, the second interrupt signal output unit, and the control unit; and
   an external circuit that stops the control of the control target by the control circuit when the output of the transmit signal from the control circuit is interrupted,
   wherein the control unit outputs a transmit signal to an outside of the control circuit according to the output of the first interrupt signal from the first interrupt signal output unit and the output of the second interrupt signal from the second interrupt signal output unit.

4. The safety controller according to claim 3, wherein the control unit stops the output of the transmit signal, upon detection of an abnormality related to the first interrupt signal and the second interrupt signal.

5. The safety controller according to claim 1, further comprising:
   a control circuit including the first carrier signal generation unit, the second carrier signal generation unit, the first interrupt signal output unit, the second interrupt signal output unit, and the control unit; and
   an external circuit that stops the control of the control target by the control circuit when the output of the transmit signal from the control circuit is interrupted,
   wherein the control unit outputs a transmit signal to an outside of the control circuit according to the output of the first interrupt signal from the first interrupt signal output unit and the output of the second interrupt signal from the second interrupt signal output unit.

6. The safety controller according to claim 3, wherein the external circuit resets the control circuit to thereby stop the control of the control target by the control circuit.

7. The safety controller according to claim 3, wherein the external circuit interrupts, in a circuit manner, a control signal to be output from the control circuit to the control target to control the control target, to thereby stop the control of the control target by the control circuit.

8. The safety controller according to claim 3, wherein
   the control circuit has a redundant configuration including a plurality of control circuits,
   the control circuit operates as the external circuit with respect to the other control circuits, and
   the control unit controls the control target to be stopped when the control unit stops the control of the control target by the other control circuits.

9. The safety controller according to claim 1, wherein the control unit detects a fact that the first interrupt signal and the second interrupt signal are not alternately output, as the fact that the first interrupt signal and the second interrupt signal are not output in the predetermined order.

10. The safety controller according to claim 2, wherein
    the predetermined phase difference is a half cycle of each of the first carrier signal and the second carrier signal,
    the first interrupt signal output unit outputs the first interrupt signal every one cycle of the first carrier signal,
    the second interrupt signal output unit outputs the second interrupt signal every one cycle of the second carrier signal, and
    the control unit detects, as the predetermined expected value, a fact that the first interrupt signal and the second interrupt signal are not output at the same interval.

11. A safety control method that executes tasks for executing processing related to control of a control target and controls the control target by scheduling a plurality of time partitions, at least one of the tasks being allocated to each of the plurality of time partitions, the safety control method comprising the steps of:
    outputting a first interrupt signal which is output in a cycle synchronous with a cycle of a first carrier signal defining a control cycle of the control target;
    switching an active time partition to a time partition to be subsequently scheduled, according to the output of the first interrupt signal;
    outputting a second interrupt signal which is output in a cycle synchronous with a cycle of a second carrier signal defining a control cycle of the control target, the first carrier signal and the second carrier signal having the same cycle and a predetermined phrase difference; and
    switching an active time partition to a time partition to be subsequently scheduled, according to the output of the second interrupt signal,
    wherein the control of the control target is stopped when it is detected that the first interrupt signal and the second interrupt signal are not output in a predetermined order.

* * * * *